D. R. PORTER.
BLOW-PIPE.
No. 192,452. Patented June 26, 1877.
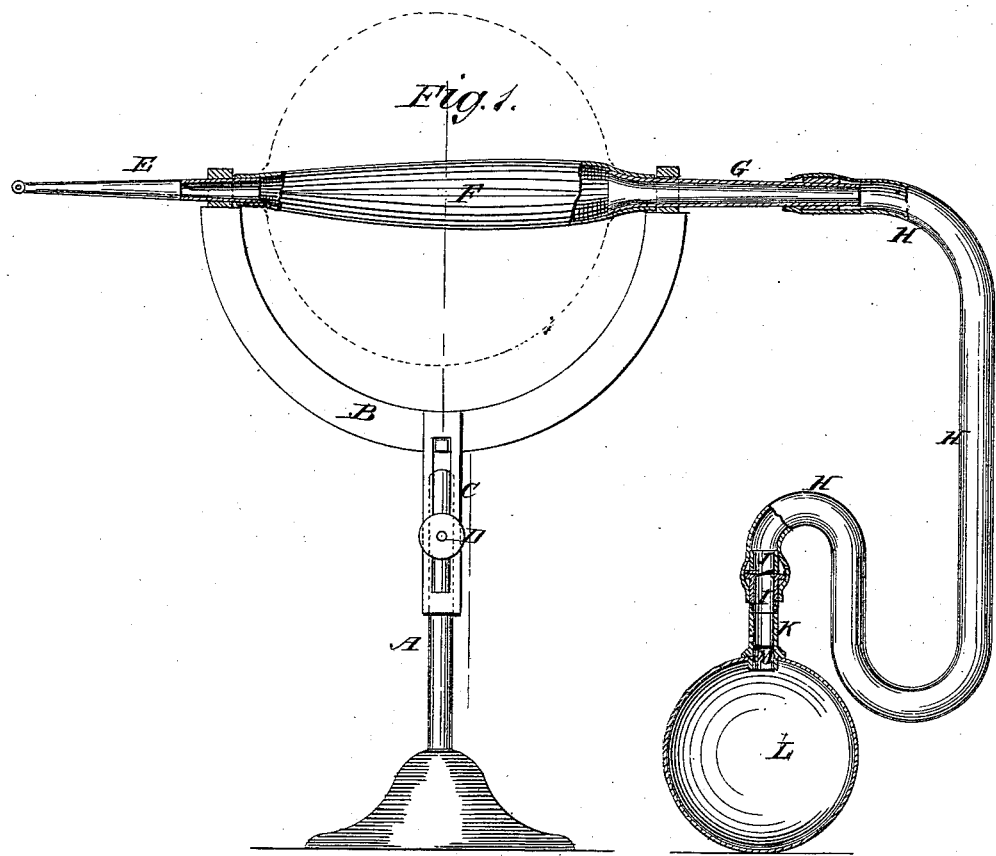
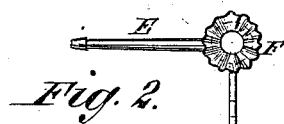
WITNESSES:
Francis McArdle
J. H. Scarborough
INVENTOR:
D. R. Porter
BY
ATTORNEYS.

UNITED STATES PATENT OFFICE.

DANIEL R. PORTER, OF LEON, IOWA.

IMPROVEMENT IN BLOW-PIPES.

Specification forming part of Letters Patent No. 192,452, dated June 26, 1877; application filed March 24, 1877.

*To all whom it may concern:*

Be it known that I, DANIEL RICHARDSON PORTER, of Leon, in the county of Decatur and State of Iowa, have invented a new and useful Improvement in Plow-Pipe, of which the following is a specification:

Figure 1 is a side view of my improved blow-pipe, partly in section, to show the construction. Fig. 2 is a vertical section of the same, taken through the line $x\ x$, Fig. 1.

Similar letters of reference indicate corresponding parts.

The object of this invention is to furnish an improved blow-pipe which shall be so constructed that the operator need not use his breath for giving the blast, and if he wishes to use his breath he can rest his lungs without interrupting the blast, and which shall be simple in construction and convenient in use, being capable of adjustment at any desired angle.

The invention will first be described in connection with the drawing, and then pointed out in the claims.

A represents a standard. B is a semi-ring plate or holder, the middle part of which is provided with a stem, C. The stem C is provided with a longitudinal slot to receive the set-screw D, by which it is secured adjustably to the standard A. In the end of one of the arms of the semi-ring plate B is secured the nozzle E of the blow-pipe. To the inner end of the nozzle E is secured the end of a rubber tube or bag, F, capable of being expanded into a sphere, and the other end of which is secured to the inner end of a short tube, G, attached to the end of the other arm of the semi-ring plate B. To the outer end of the tube G is attached the end of a rubber tube, H, the other end of which is attached to a short metal tube, I. The tube I is provided with a valve, J, to prevent the air in the rubber tube or bag F from returning. The valve J may be placed in the tube G, if desired. To the outer end of the tube I is screwed a short tube, K, to the outer end of which is attached a rubber ball, L. The tube K is provided with an inlet-valve, M.

With this construction, when the ball L is compressed the air contained in it is forced into the rubber bag F, is kept from returning by the valve J, and escapes from the nozzle E in a steady stream.

As the ball L is released from pressure it is again filled with air through the valve M, and is again ready to be compressed to force more air into the rubber bag F.

If desired, the rubber ball L and its valve M may be replaced by any other desired kind of bellows. I prefer to use a bellows operated by a treadle, as it leaves both hands free to hold the work.

When the operator wishes to use his breath, he detaches the bellows and blows into the pipe I or G, according as the valve J is placed in the one or the other of said pipes.

In this case the expansion of the rubber bag F allows his lungs to rest, while at the same time the said rubber bag, by its contraction, forces the air out through the nozzle E in a steady stream.

The nozzle E may be an ordinary blow-pipe, and may be used without the attachment when desired.

Having thus described my invention, I claim as new and desire to secure by Letters Patent—

1. The combination, with nozzle E, bag F, and tube G, of the rubber tube and ball provided with valves J M, arranged as shown and described, for the purpose specified.

2. The combination of the stand A and the adjustable holder B C D with the nozzle E, rubber bag F, and tube G, substantially as herein shown and described.

DANIEL RICHARDSON PORTER.

Witnesses:
  I. F. HILDRETH,
  MAC. SANFORD.